United States Patent
Konstantinides et al.

(10) Patent No.: US 6,314,208 B1
(45) Date of Patent: *Nov. 6, 2001

(54) SYSTEM FOR VARIABLE QUANTIZATION IN JPEG FOR COMPOUND DOCUMENTS

(75) Inventors: Konstantinos Konstantinides, SanJose; Daniel R. Tretter, Mountian View, both of CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,072

(22) Filed: Jul. 21, 1998

(51) Int. Cl.[7] .................................................. G06K 9/36
(52) U.S. Cl. .......................................... 382/239; 382/251
(58) Field of Search .................................... 348/403, 404, 348/405; 358/430, 433; 382/239, 250, 251

(56) References Cited

U.S. PATENT DOCUMENTS

| | | | |
|---|---|---|---|
| 5,121,216 | * 6/1992 | Chen et al. | 358/261.3 |
| 5,128,757 | 7/1992 | Citta | 358/133 |
| 5,321,440 | * 6/1994 | Yanagihara et al. | 358/408 |
| 5,333,212 | 7/1994 | Ligtenberg | 382/56 |
| 5,374,958 | * 12/1994 | Yanagihara | 375/240.04 |
| 5,517,327 | * 5/1996 | Nakatani et al. | 358/462 |
| 5,699,457 | * 12/1997 | Adar et al. | 382/239 |
| 5,724,453 | 3/1998 | Ratnakar | 382/251 |
| 5,875,041 | * 2/1999 | Nakatani et al. | 358/462 |
| 5,907,362 | * 5/1999 | Yamamoto | 375/240.04 |
| 5,959,675 | * 9/1999 | Mita et al. | 375/240.04 |
| 6,014,467 | * 1/2000 | Asano | 328/250 |
| 6,075,619 | * 6/2000 | Lizuka | 358/432 |

OTHER PUBLICATIONS

European Search Report, Application No.: EP 99 30 477. dated Nov. 6, 2000.

Hie Tan Soon, et al: "Classified Perceptual Coding with Adaptive Quantization" IEEE Transactions on Circuits and Systems for Video Technology, Aug. 1996, IEEE, USA, vol. 6, No. 4, pp. 375–388, XP002152024. ISSN: 1051–8215.

V. Bhasharan, et al: "Text and Image Sharpening of Scanned Images in the JPEG domain" Proceedings. International Conference on Image Processing (CAT. No. 97CB36144), Santa Barbara, CA, USA, Oct. 26–29, 1997, pp. 326–329, vol. 2, XP002152025, 1997, Los Alamitos, CA, USA. IEEE Comput. SOc. USA. ISBN: 0–8186–8183–7.

R. Rosenholtz, et al: "Perceptual Adaptive JPEG Coding" Proceedings. International Conference on Image Processing (CAT> No. 96CH35919). Proceedings of 3rd IEEE International Conference on Image Processing, Lausanne, Switzerland, Sep. 16–19, 1996, pp. 901–904, vol. 1, XP000956371, 1996, New York, NY, USA, IEEE, USA ISBN: 0–7803–3259–8.

* cited by examiner

Primary Examiner—Yon J. Couso

(57) ABSTRACT

An image compression system for compound images containing both text and pictures. The system is capable of receiving the images on a non-overlapping 8 by 8 pixel blank basis and includes a discrete cosine transformer connected to a quantizer drawing lossy quantization factors from quantization tables. The lossy quantization factors are modified by a variable quantization subsystem based on the frequency of changes in the block to provide low lossy quantization factors for high frequency of changes and high lossy quantization factors for low frequency of changes. The high frequency of changes being indicative of text and the low frequency of changes being indicative of pictures. The quantizer is connected to an entropy coder using lossless entropy encoding factors from Huffman tables to provide JPEG compliant files.

20 Claims, 2 Drawing Sheets

SYSTEM FOR VARIABLE QUANTIZATION IN JPEG FOR COMPOUND DOCUMENTS

TECHNICAL FIELD

The present invention relates generally to JPEG data compression and more specifically to JPEG data compression for compound images having pictures and text.

BACKGROUND ART

JPEG is the name of both a committee and a standard. JPEG stands for Joint Photographic Experts Group, the original name of the committee that wrote the JPEG standard. The JPEG standard is an international standard which applies to the lossy and lossless compression of either full-color or gray-scale images of natural, real-world scenes.

Lossy image compression compresses by striving to discard as much of the image data as possible without significantly affecting the appearance of the image to the human eye. Lossless compression is compression achieved without discarding any of the image data.

The JPEG standard works well on still photographs, naturalistic artwork, and similar material (which are generally referred to herein as "pictures"), but not so well on lettering, simple cartoons, or line drawings (which are generally referred to herein as "text"). Compound images are those which contain both pictures and text (which are collectively referred to herein as "images"). In some cases, compound images contain pictures which also contain text within the picture itself This standard is being used in the computer industry. Popular graphics-capable browsers on the World Wide Web can read and write this particular type of image data format, so if a compressed image is sent across the Web to such a browser, it knows how to decompress the image and display it.

Compression is important for two main reasons. The first is storage space. If there will be a large number of images on a hard drive, the hard drive will fill up very quickly unless the data can be greatly compressed. Computers have fixed size buffers and limited memory, and an image has to fit in them otherwise, the image cannot be stored in them.

The second is bandwidth. If data is being sent through a browser or through electronic mail, the more bits that need to be transmitted, the more time is required. For example, with a 28.8K modem it may take half an hour of waiting for a picture to be completely transmitted. If a 50 to 1 compression can be achieved, the same picture can be transmitted completely in about thirty seconds, and if compressed properly, the recipient will not notice the difference between the original and the compressed version.

For full-color images, the uncompressed data is normally 24 bits per pixel. JPEG can typically achieve 10:1 to 20:1 compression on pictures without visible loss, bringing the effective storage requirement down to 1 to 2 bits per pixel. This is due to the fact that small color changes are perceived less accurately than small changes in brightness. Even 30:1 to 50:1 compression is possible with small to moderate defects, while for very low quality purposes such as previews or archive indexes, 100:1 compression is quite feasible.

For gray-scale, and black and white images such large factors of compression are difficult to obtain because the brightness variations in these images are more apparent than the hue variations. A gray-scale JPEG file is generally only about 10%–25% smaller than a full-color JPEG file of similar visual quality with the uncompressed gray-scale data at only 8 bits/pixel, or one-third the size of the color data. The threshold of visible loss is often around 5:1 compression for gray-scale images.

Although there are a number of settings that can be predefined to achieve different compression ratios, there is only one parameter, called the quality factor, that is adjusted regularly in JPEG on an image-by-image basis with one setting for an active image. The quality factor is a single number in an arbitrary, relative scale. A high quality factor will provide a relatively high quality decompressed image, but will require a relatively large file. And, of course the lower the quality, the rougher the approximation of the image and the more compression with a correspondingly smaller file size, but also, the more visible defects, or artifacts, will be in the decompressed final image. Text generally shows significant compression artifacts at higher quality factors than pictures. Further, the quality factor will only give an approximate end file size.

Therefore, a long sought goal in image compression has been to maintain maximum perceptible image quality while achieving maximum compression.

This goal is becoming more difficult to attain because compound documents are just starting to become more and more important. It has only been recently that it has become possible to drop pictures into text documents as much as can be done now. Before, electronic transmissions were either a text document or a picture document. Now, it is more and more common to see a compound image where someone is making a newsletter or setting up a website. People want to drop in some pictures but also want to have text as well. So compound documents are becoming a more important, whether it is just photocopying or just sending to a printer or transmitting across the internet, these have become a more important class of images.

Also, most of the techniques that have been developed in the past for compound documents are based on proprietary (non-standard) compression techniques, so the images could only be decompressed using a specific company's product.

It has long been known that the inability to minimize file size while maintaining high perceptual quality would lead to detrimental compromises in performance so process improvements have been long sought but have eluded those skilled in the art. Similarly, it has long been known that the problems would become more severe with compound documents and thus a generally applicable solution has been long sought.

DISCLOSURE OF THE INVENTION

The present invention provides a simple metric for picture/text segmentation of compound documents in the discrete cosine transform domain. This allows areas of high frequency content such as text to be compressed at a better quality than pictures, thus improving the overall perceptual quality while minimizing the file size. The metric is computed using the quantized output of the discrete cosine transform. No other information is needed from any other part of the JPEG coder.

The present invention provides an image compression system which can be used to apply different, appropriate quantization factors to small blocks of pictures and text to provide significant image compression.

The present invention further provides an image compression system capable of distinguishing between text and pictures in compound images.

The present invention still further provides for preserving the text quality without sacrificing bandwidth while at the same time being JPEG compliant.

The present invention also provides an image compression system which is fully compliant with the latest extensions of the current JPEG standard.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
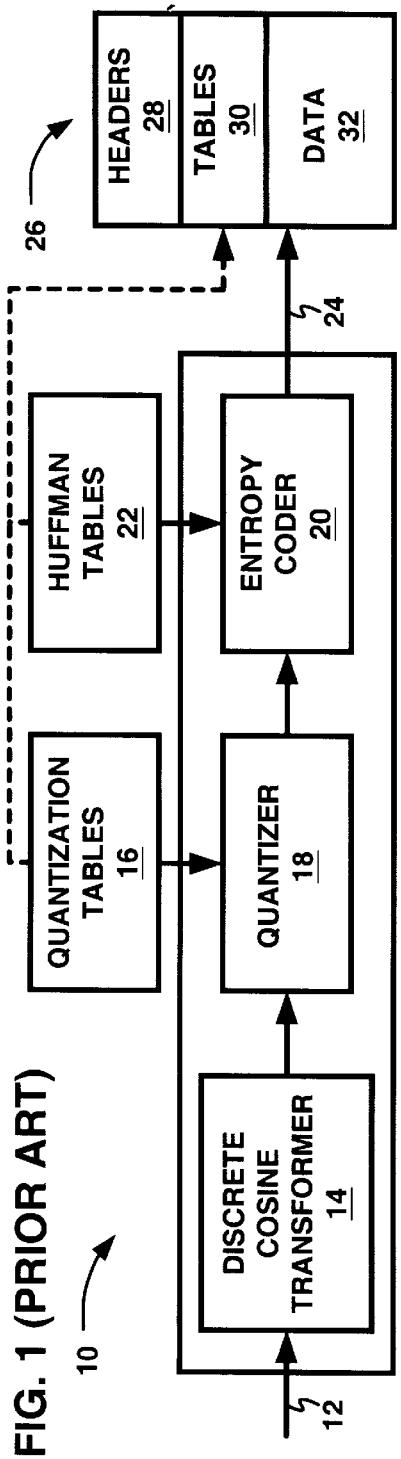
FIG. 1 (PRIOR ART) is a schematic of a prior art baseline JPEG encoder.

Referring now to FIG. 1 (PRIOR ART), therein is shown a baseline JPEG encoder system 10 for digital cameras, scanners, printers, imaging servers, etc. The JPEG encoder system 10 is for an image with a single color component. For color images, there would be a JPEG encoder system 10 for each of the color components.

The system 10 receives image pixels, or input digital image data, at an input 12 which is connected to a discrete cosine transformer 14. The discrete cosine transformer 14 first divides the input digital image data 12 into non-overlapping, fixed length image blocks, generally 8 by 8. After a normalization step, the discrete cosine transformer 14 reduces data redundancy and transforms each fixed length image block by applying a discrete cosine transform to a corresponding block of discrete cosine transform coefficients. This transform converts each fixed length image block into the frequency domain as a new frequency domain image block. The first coefficient in the block, the lowest frequency coefficient, is the DC coefficient and the other coefficients are the AC coefficients (e.g., for an 8 by 8 block, there will be one DC coefficient and 63 AC coefficients).

Quantization tables 16 are operatively connected to the discrete cosine transformer 14. The quantization tables 16 contain lossy quantization factors (scaled according to the factor) to be applied to each block of discrete cosine transform coefficients. One set of sample tables is given in Annex K of the JPEG standard (ISO/IEC JTC1 CD 10918; ISO, 1993). These tables and the user-defined quality factors do not actually provide compression ratios per se, but provide factors indicating how much the image quality can be reduced on a given frequency domain coefficient before the image deterioration is perceptible.

It should be understood that the tables represent tabulations of various equations. The look-up tables could be replaced by subroutines which could perform the calculations to provide the factors.

A quantizer 18 is connected to the discrete cosine transformer 14 and the quantization tables 16 to divide each frequency domain image block by the corresponding element from he quantization table 16 to output the quantized discrete cosine transform output.

An entropy coder 20 is connected to the quantizer 18 and to Huffman tables 22. The entropy coder 20 receives the output from the quantizer 18 and rearranges it in zigzag order. The zigzag output is then compressed using run-length encoding in the entropy encoder 20 which is a lossless entropy coding of each block of quantized discrete cosine transform output. The entropy encoder 20 of the present invention uses Huffman codes from the Huffman tables 22 although arithmetic coding can also be used. The Huffman codes exploit similarities across the quantized discrete cosine transform coefficients. JPEG contains two sets of typical Huffman tables, one for the luminance or grayscale components and one for the chrominance or color components. Each set has two separate tables, one for the DC components and the other for the AC.

The bitstream out of the entropy coder 20 at output 24 is a JPEG file 26 which contains headers 28, tables 30, and data 32. The tables 30 contain information from the quantization tables 16 and the Huffman tables 22 of the appropriate information used in the processing of each block of data so the data can be properly decompressed. The data 32 contains the output from the entropy coder 20 in a form of a compressed block such that a sequence of all of the compressed blocks forms the compressed digital image data.

Figure 2:
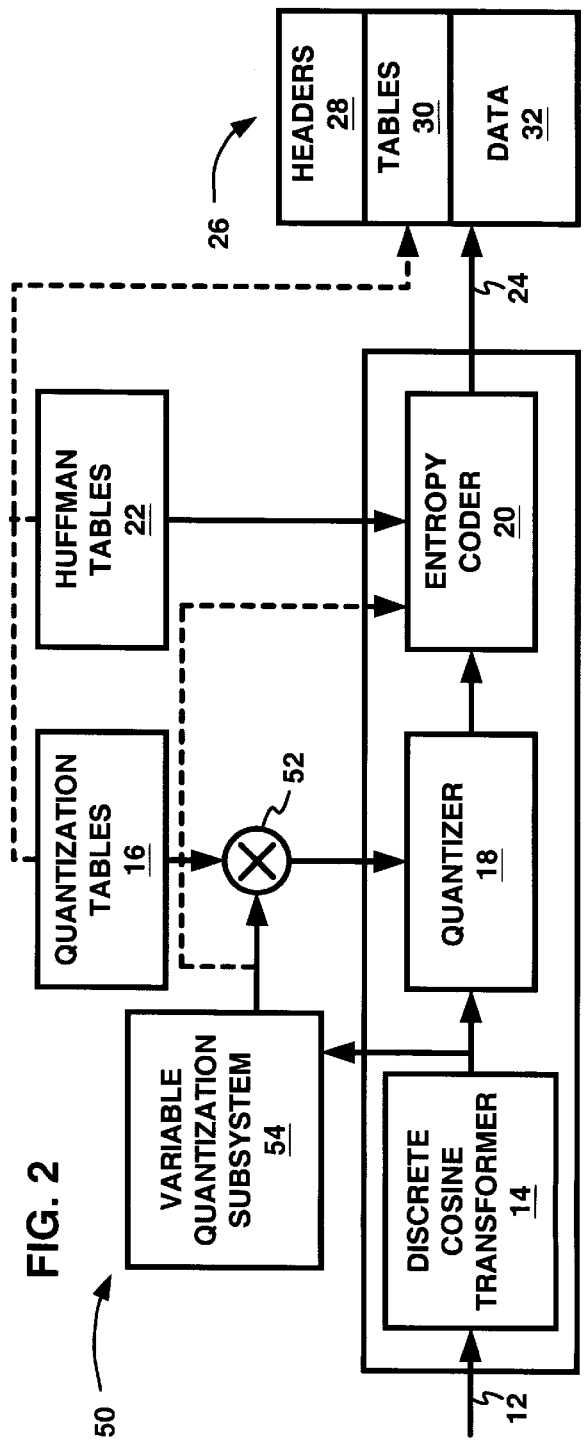
FIG. 2 is a schematic of a JPEG Part 3 encoder that supports variable quantization.

Referring now to FIG. 2, therein is shown a JPEG encoder system 50 that supports the variable quantization of the present invention. The system 50 is compliant with the JPEG Part 3 standard. The same elements as in FIG. 1 (PRIOR ART) are given the same numbers in FIG. 2. Thus, the system 50 receives input digital image data 12 into the discrete cosine transformer 14 which is connected to the quantizer 18.

The quantization tables 16 are connected to a multiplying junction 52 which is connected to the quantizer 18. Also connected to the multiplying junction 52 is a variable quantization subsystem 54 which is also connected to the entropy coder 20.

The entropy coder 20 is connected to the quantizer 18 and to the Huffman tables 22. The bitstream out of the entropy coder 20 at output 24 is a JPEG file 26 that contains headers 28, tables 30, and data 32. The tables 30 contain compression-related information from the quantization tables 16 and the Huffman tables 22 which can be used by a JPEG decompresser system (not shown) to decompress the data 32 from the entropy coder 20. The quantization scale factor from the variable quantization subsystem 54 are incorporated into the data 32 by the entropy encoder 20.

Figure 3:
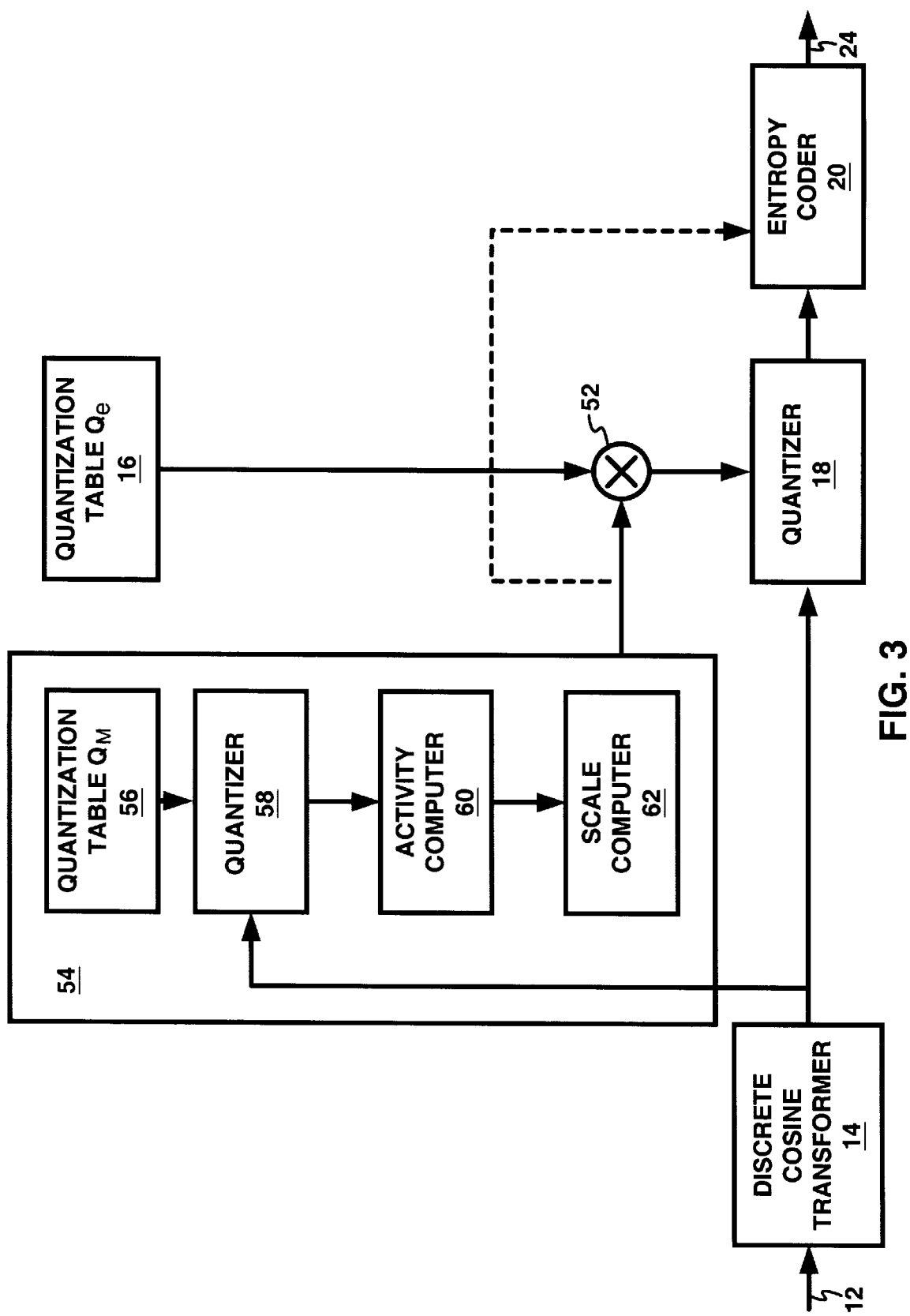
FIG. 3 is a schematic of a variable quantization subsystem of the present invention.

Referring now to FIG. 3, therein is shown the variable quantization subsystem 54 which is operatively connected to the discrete cosine transformer 14. The discrete cosine transformer 14 is connected to a quantizer 58 in the variable quantization subsystem 54. The quantizer 58 has quantization tables 56 connected to it which are the factors relating to the activity metrics. The quantizer 58 is the same as the quantizer 18. For simplicity, the quantization tables 56 for the activity metrics are the same as the quantization tables 16 for the encoding, but this is not necessary.

The quantizer 58 is further connected to an activity computer 60 for computing an activity metric, $M_i$, as will later be described. The activity computer 60 is connected to a scale computer 62 for computing qscale as will also later be described. The scale computer 62 is connected to the multiplying junction 52 to which the quantization table 16 is connected. The discrete cosine transformer 14 as well as the multiplying junction 52 are connected to the quantizer 18 as also shown in FIG. 2.

In operation in the FIG. 1 (PRIOR ART) baseline JPEG encoder system 10, image pixels are divided into non-overlapping 8×8 blocks where $y_i$ denotes the i-th input block. This division applies to all images including text, pictures, and compound images as well as pictures containing text. After a normalization step, each block is transformed into the frequency domain using the discrete cosine transform.

Mathematically JPEG uses the discrete cosine transform in its processing. A discrete cosine transform in the frequency domain is based on the assumption that an image mirrors itself on both boundaries. This assures a smooth transition without high frequency spikes, because those are very hard to compress. And the higher frequencies are very close to zero if there is a smoothly varying function.

The output of the above step will be a new 8×8 matrix $Y_i$. Next, each element of $Y_i$ is divided by the corresponding element of the encoding quantization table $Q_e$. Given $Q_e[j, k]$, $$Y_{Qe,i}[j, k] = \text{round}\left(\frac{Y_i[j, k]}{Q_e[j, k]}\right)$$

In the baseline JPEG encoder system 10, a single set of quantization tables 16 is used 30 for the whole image. For a cmpnd 1 ISO test image, the whole image would be 512 pixels by 513 pixels.

After quantization, the quantized discrete cosine transformer 14 output is rearranged in raster, or zigzag, order and is compressed using run-length encoding which is a lossless, entropy coding using the Huffman tables 22 in the entropy coder 20. According to the JPEG standard, the quantization tables for each color component can be defined in the header tables 30 of the JPEG file 26. The output of the entropy coder 20 is a sequence of compressed blocks which form the compressed image which can be decompressed by a standard JPEG decompression system.

In operation, the variable quantization JPEG encoder system 50 of the present invention shown in FIG. 2 uses the JPEG adjunct standard (ISO/IEC JTC1 CD 10918; ISO, 1993) which has been extended to support variable quantization. Under variable quantization, the values of the original quantization matrix can be rescaled on small blocks of pixels as small as 8 pixels by 8 pixels. Normally the quantization matrix stays the same for the entire image, but the adjunct standard allows these changes on a block by block basis. This change was designed primarily for a rate control problem of getting the proper number of bits at the output. If a block is changed, the information can be put into the bitstream so that a decoder on the receiving end can undo it later. Thus, the various scaling factors are also encoded as part of the data bitstream. In principal, variable quantization allows for better rate control or more efficient coding which is the original purpose for the JPEG extension.

Even though the latest JPEG extensions provide the syntax for the support of variable quantization, the actual way to specify the scaling factors is application dependent and not part of the JPEG adjunct standard.

The present invention allows for the variable quantization of compound images. The JPEG encoder system 50 of FIG. 2 automatically detects the text-part and the image-part of a document by measuring how quickly pixels are changing in the incoming data. Black text on a white background changes very quickly from black to white and back again even within a very small block of pixels. Picture pixels, for example the image of a human face, change much more slowly through gradations of color.

In the JPEG standard, the quantization is being done in a transformed domain, not on the pixels directly. The pixels are transformed through a linear matrix transform (the discrete cosine transform) into a frequency domain representation, and the quantization is performed in the frequency domain. It is also in the frequency domain that the frequency components can be determined to find how active a particular block is. The mathematical equation used is what provides an "activity metric". The larger this activity metric turns out to be, the more things are changing within the 8 by 8 block.

Also, the discrete cosine transform has the advantage that it takes real numbers and transforms them into real numbers which can be quantized. In this domain, it is possible to predict, roughly, how many bits it takes to represent the data that is actually in the block.

To represent a given number, such as every number between 0 and 15, the largest number is taken, and the log base 2 of this provides the number of bits required. In this case it would be 4 because with 4 bits every number between 1 and 15 can be represented.

Thus by taking the absolute value of the real numbers, taking the log base 2 of them, which tells how many bits needed for each one and then summing them up, and that provides how many bits are needed to represent the data in the entire block. This number is going to be very large if there is a lot of activity because a lot of the frequency components will be big, and it is going to be very small if the image changes slowly because all the high frequencies will be close to zero.

Based on the discrete cosine transform activity of a block or a macroblock (a 16×16 block), quantization scaling factors are derived that automatically adjust the quantization so that text blocks are compressed at higher quality than image blocks. Those skilled in the art would be aware that text is more sensitive to JPEG compression because of its sharp edges which, if compressed too greatly, would blur or have ringing artifacts (ripples around the edges). At the same time, images can be compressed greatly without drastically affecting human-eye perceived differences in quality of the image.

There are many ways to measure activity in a block. One method to determine the discrete cosine transform activity is to let $Y_i[j, k]$ denote the elements of the i-th output block of the discrete cosine transform so $Y_i[0, 0]$ denotes the DC component of the i-th block. In the present invention, the activity computer 60 uses the following activity metric:

$$M_i = \frac{1}{64}\left[\log_2|Y_i[0, 0] - Y_{i-1}[0, 0]| + \sum_{j,k} \log_2|Y_i[j, k]|\right]$$

where the summation is performed over all elements of the $Y_i[j, k]$ matrix except $Y_i[0, 0]$. (The above formulation assumes that arguments in the $\log_2$ function are always greater than zero.)

The motivation behind this metric is based on the fact that: (a) JPEG uses differential coding for the encoding of the discrete cosine coefficients, and (b) the number of bits needed to code a DC transform coefficient are proportional to the base-two logarithm of its magnitude. The equation does not (and does not need to) account for additional coding bits needed for the Huffman coding of either size or run/size information of the discrete cosine transform coefficients. The number of these bits ranges from 2 to 16 per non-zero coefficient. Assuming that on the average c bits per non-zero coefficient are required for this purpose, then the following method can be used to compute $M_i$ (and the overall bit rate) more accurately.

Begin
  $M_i=0$
  $D=|Y_i[0, 0]-Y_{i-1}[0, 01]|$
  if D>0 then $M_i=M_i+\log_2 D+c$ j=0
  for k=1 to 7
    if $|Y_i[j, k]|<0$ then $M_i=M_i+\log_2|Y_i[j, k]|+c$ for j=1 to 7
    for k=0 to 7
      if $|Y_i[j, k]|<0$ then 4 $M_i=M_i+\log_2|Y_i[j, k]|+c$ End
In experiments, c=4.

After defining an activity metric, the next step is to define the relationship between the activity measure and the quantization scale.

The cmpnd 1 ISO test image is used as the standard compound image with computer generated text, a photographic-type color image, and computer generated text within the image. The top half is text and the bottom half the color image. This is a 512×513 pixels total image, with 1,056 macroblocks (16×16 pixel blocks). The color image part starts at approximately the 508-th macroblock.

The values of the activity metric, $M_i$, calculated in the activity computer 60 for each of the luminance macroblocks in the ISO test image is higher in the text regions of the image. However, discrimination between image and text areas is even better if $M_i$ is computed using quantized values of $Y_i$; that is, $Y_{QM,i}$. When the quantization matrices $Q_M$ and $Q_e$ in quantization tables 56 and 16, respectively, are both the same as the one given in Annex K of the JPEG standard, activity values larger than 1.2 correspond to text areas in the image. It should be understood that the two quantization tables 56 and 16 could be different. Experiments show that the range of values for $M_i$ for the ISO test image is consistent with the range of values obtained from other test images.

Basically quantization varies inversely with the metric. If a higher metric means a higher activity, thus scale by less to quantize more finely or compress less. And then with a very small metric, scale the quantization very coarsely or compress more because the image is such a smooth block, that it does not matter how much quantization since it will not be perceptible.

The output of the scale computer 62 is qscale, which denotes the parameter used to scale the AC values of the original quantization matrix, a value of qscale=0.5 is quite acceptable for the compression of text. On the other hand, values of qscale larger than 2 may yield serious blocky artifacts on an image. To simplify implementation, a linear, but bounded, relationship between qscale and the activity metric ($M_i$) is superior, such as $$qscale_i = \begin{cases} a \times M_i + b & \text{if } 2 > a \times M_i + b \geq 0.4 \\ 0.4 & \text{if } a \times M_i + b < 0.4 \\ 2 & \text{if } a \times M_i + b > 2 \end{cases}$$

where a and b are constants to be defined based on desired output quality and compression ratios. One way a and b can be defined is the follows. Let $m_l$ denote the value of the activity metric, $M_i$, for which qscale=1. Let $m_u$ denote the value of $M_i$ for which qscale=0.5. After solving two equations with two unknowns:

$$a = \frac{0.5}{m_l - m_u}$$

For example, if $m_l=0.6$ and $m_u=1.2$, then a=−0.83 and b=1.498.

The choices for $m_l$ and $m_u$ effect compression ratios as follows. If $m_l$ is increased, in effect more blocks are quantized with a qscale>1; thus compression is improved but image quality may be reduced. If $m_u$ is increased, the number of blocks that are quantized with qscale=0.5 is decreased; thus the quality of text is decreased, but the compression ratios are improved.

In the variable quantization subsystem of FIG. 3 showing the variable quantization method, the $Q_M$ quantization matrix is the same as $Q_e$, but this may not be always the case. For example, $Q_M$ may be the same as Appendix K of the JPEG standard, but $Q_e$, may be a custom quantization table.

Using the above metric, the upper text areas in the ISO test image were identified as areas of high frequency activity, but also the text inside the color picture at the bottom half.

The qscale is provided to the multiplying junction 52 to control $Q_e$ from the quantization table 16 to the quantizer 18.

It should be understood that the same method as described above may be used to adjust the chroma quantization tables independently from the luminance tables using the same scaling factors.

JPEG, itself, as a standard doesn't specify what to do about color. But, what is commonly done, is to convert a color image into a luminance and chrominance representation so that it shows the brightness of the image with two other components that show the colorfulness. And it turns out that the human eye is much more sensitive to the luminance. A slow transition from a red to an orange versus a sharp one will not even be noticeable, but a slow transition in luminosity versus a sharp one will be noticeable as a blur. In the present invention, the activity metric is computed only for the luminance component to save on computation and then the chrominance is scaled the same way. That turns out to work reasonably well on the chrominance as well, because compound documents usually have black text on a white background and errors in the color are particularly noticeable. A little red fringe around each letter will be seen immediately but it is less likely to be seen in an image.

As would be understood by those skilled in the art, the present invention has been described in terms of discrete components but it may be carried out in software or in dedicated integrated circuits.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. Variable quantization apparatus for an image encoder system having an interconnected transformer, quantizer, and entropy encoder, comprising:

variable quantization means operatively connected to the transformer and the quantizer responsive to a plurality of blocks of data from the transformer to determine the characteristics of a plurality of blocks of digital pixel data inputted to the transformer by computing an image related metric for each block of the plurality of blocks of data;

quantization factoring means connected to said variable quantization means for providing a predetermined lossy quantization factor for each metric; and said variable quantization means including means for causing the quantizer to apply a lossy quantization factor to each block of the plurality of blocks of data based on said metric to provide a predetermined size block of quantized data and to provide a plurality of blocks of quantized data to the entropy encoder whereby the plurality of blocks of quantized data have a minimum size for said image.

2. The variable quantization apparatus as claimed in claim 1 wherein:

said variable quantization means includes scaling means for scaling said metric for each block of the plurality of blocks of data to provide a lower lossy quantization factor for metrics for predetermined types of images and a higher lossy quantization factor for metrics for other predetermined types of images.

3. The variable quantization apparatus as claimed in claim 1 wherein:

said variable quantization means includes:
quantization tables for providing a predetermined lossy quantization factor for predetermined of blocks of data;
a quantizer connected to the transformer and said quantization tables for applying a lossy quantization factor to said each block of said plurality of blocks of data to compute said metric for each block of said plurality of blocks of data.

4. The variable quantization apparatus as claimed in claim 3 including:

multiplier means connected to said quantization tables, said variable quantization means, and said quantizer for applying a lossy quantization factor, which is a function of said metric, and data to said each block of said plurality of blocks of data.

5. The variable quantization apparatus as claimed in claim 1 wherein:

said variable quantization means computes the metric as an image activity metric according to the equation:

$$M_i = \frac{1}{64}\left[\log_2|Y_i[0,0] - Y_{i-1}[0,0]| + \sum_{j,k}\log_2|Y_i[j,k]|\right]$$

where: $Y_i[j,k]$ denote the elements of the i-th block output by the transformer; and $Y_i[0,0]$ denotes the transformed DC component of the i-th block.

6. The variable quantization apparatus as claimed in claim 1 wherein:

said variable quantization means includes scaling means for scaling said metric as an activity matrix for each of the plurality of blocks of data provided by the transformer as frequency data to provide a lower lossy quantization factor for higher activity metrics proportionally than a higher lossy quantization factor for lower activity metrics whereby one type of image is compressed at a higher quality while another type of image is compressed at a lower quality according to the equations:

$$qscale_i = \begin{cases} a \times M_i + b & \text{if } 2 > a \times M_i + b \geq 0.4 \\ 0.4 & \text{if } a \times M_i + b < 0.4 \\ 2 & \text{if } a \times M_i + b > 2 \end{cases}$$

where: a and b are predetermined functions of said activity metric.

7. The variable quantization apparatus as claimed in claim 1 wherein said blocks of digital pixel data are 8 by 8 pixels.

8. An image compression system capable of compressing text and pictures, comprising:

a discrete cosine transformer capable of receiving an image in the form of a plurality of blocks of digital pixel data of the text and pictures, said discrete cosine transformer for applying a discrete cosine transform to said plurality of blocks of digital pixel data to provide a plurality of blocks of discrete cosine transform coefficients representative of the frequency of changes in said digital pixel data whereby a high frequency of changes indicates text and a low frequency of changes indicates pictures;

a variable quantization subsystem operatively connected to said discrete cosine transformer responsive to each block of said plurality of blocks of discrete cosine transform coefficients to determine the activity of said digital pixel data by computing an activity metric for each block of said plurality of blocks of discrete cosine transform coefficients whereby a high frequency of changes has a high activity metric and a low frequency of changes has a low activity metric;

quantization tables for providing a predetermined lossy quantization factor for each activity metric whereby a high activity metric has a low lossy quantization factor and a low activity metric has a high lossy quantization factor;

a quantizer connected to said discrete cosine transformer, said variable quantization subsystem, and said quantization tables for applying a predetermined lossy quantization factor to each block of said plurality of blocks of discrete cosine transform coefficients based on said activity metric for each block of said plurality of blocks of discrete cosine transform coefficients to provide a predetermined size block of quantized data and to provide a plurality of blocks of said quantized data whereby said plurality of blocks of said quantized data have a minimum size for said image;

Huffman tables for providing a predetermined lossless entropy encoding factor for each block of said quantized data; and an entropy coder connected to said Huffman tables and said quantizer to apply a lossless entropy encoding factor to each block of said plurality of blocks of quantized data to output a plurality of blocks of compressed entropy coded data in a digital file with the lossy quantization factor and the lossless entropy encoding factor applied to each block of said plurality of blocks of compressed entropy coded data.

9. The image compression system as claimed in claim 8 wherein:

said variable quantization subsystem includes a scaling computer for scaling said activity metric for each block of said plurality of blocks of discrete cosine transform coefficients to provide a lower lossy quantization factor for higher activity metrics proportionally than the lossy quantization factor for lower activity metrics whereby the text is compressed at a higher quality while the pictures are compressed at a lower quality.

10. The image compression system as claimed in claim 8 wherein:
said variable quantization subsystem includes:
quantization tables for providing a predetermined lossy quantization factor for predetermined of blocks of discrete cosine transform coefficients;
a quantizer connected to said discrete cosine transformer and said quantization tables for applying a lossy quantization factor to said each block of said plurality of blocks of discrete cosine transform coefficients to compute said activity metric for each block of said plurality of blocks of discrete cosine transform coefficients.

11. The image compression system as claimed in claim 8 including:
a multiplying junction connected to said quantization tables, said variable quantization subsystem, and said quantizer for applying a lossy quantization factor which is a function of said activity metric and discrete cosine transform coefficients to said each block of said plurality of blocks of discrete cosine transform coefficients.

12. The image compression system as claimed in claim 8 wherein:
said variable quantization subsystem computes the activity metric according to the equation:

$$M_i = \frac{1}{64}\left[\log_2|Y_i[0, 0] - Y_{i-1}[0, 0]| + \sum_{j,k}\log_2|Y_i[j, k]|\right]$$

where: $Y_i[j, k]$ denote the elements of the i-th block output by the discrete cosine transformer;
$Y_i[0,0]$ denotes the transformed DC component of the i-th block; and
the $\log_2$ arguments are greater than zero.

13. The image compression system as claimed in claim 8 wherein:
said variable quantization means includes scaling means for scaling said activity metric for each block of said plurality of blocks of discrete cosine transform coefficients to provide a lower lossy quantization factor for higher activity metrics proportionally than a higher lossy quantization factor for lower activity metrics whereby the text is compressed at a higher quality while the pictures are compressed at a lower quality according to the equations:

$$qscale_i = \begin{cases} a \times M_i + b & \text{if } 2 > a \times M_i + b \geq 0.4 \\ 0.4 & \text{if } a \times M_i + b < 0.4 \\ 2 & \text{if } a \times M_i + b > 2 \end{cases}$$

where: a and b are predetermined functions of the activity metric.

14. The image compression system as claimed in claim 8 wherein:
said variable quantization means includes scaling means for scaling said activity metric for each block of said plurality of blocks of discrete cosine transform coefficients in macroblocks of 16 by 16 blocks to provide a lower lossy quantization factor for higher activity metrics proportionally than a higher lossy quantization factor for lower activity metrics whereby the text is compressed at a higher quality while the pictures are compressed at a lower quality according to the equations:

$$qscale_i = \begin{cases} a \times M_i + b & \text{if } 2 > a \times M_i + b \geq 0.4 \\ 0.4 & \text{if } a \times M_i + b < 0.4 \\ 2 & \text{if } a \times M_i + b > 2 \end{cases}$$

where: a and b are predetermined functions of the activity metric.

15. The image compression system as claimed in claim 8 wherein said blocks of digital pixel data are 8 by 8 pixels.

16. An image compression system capable of compressing text and pictures, comprising:
a discrete cosine transformer capable of receiving an image in the form of a plurality of blocks of digital pixel data of the text and pictures, said discrete cosine transformer for applying a discrete cosine transform to said plurality of blocks of digital pixel data to provide a plurality of blocks of discrete cosine transform coefficients representative of the frequency of changes in said digital pixel data whereby a high frequency of changes indicates text and a low frequency of changes indicates pictures;
a variable quantization subsystem operatively connected to said discrete cosine transformer responsive to each block of said plurality of blocks of discrete cosine transform coefficients including:
subsystem quantization tables for providing a predetermined lossy quantization factor for predetermined of blocks of discrete cosine transform coefficients;
a subsystem quantizer connected to said discrete cosine transformer and said subsystem quantization tables for applying a lossy quantization factor from said quantization tables to said each block of said plurality of blocks of discrete cosine transform coefficients to provide a plurality of quantized data blocks;
an activity computer connected to said quantizer for calculating an activity metric for each block of said quantized data blocks with high frequency data having a high activity metric and low frequency data having a low activity metric;
a scaling computer for determining predetermined relationships between said activity metric and quantization scale for said quantization table;
quantization tables for providing a predetermined lossy quantization factor for each block of said plurality of discrete cosine transform coefficients;
a multiplying junction connected to said scale computer and said quantization tables for scaling said predetermined lossy quantization factor by calculated amounts and providing predetermined, scaled, lossy quantization factors;
a quantizer connected to said discrete cosine transformer and said multiplying junction for applying said predetermined, scaled, lossy quantization factor to each block of said plurality of blocks of discrete cosine transform coefficients to provide a predetermined size block of quantized data and to provide a plurality of blocks of said quantized data whereby said plurality of blocks of said quantized data have a minimum size for said image;

Huffman tables for providing a predetermined lossless entropy encoding factor for each block of said predetermined of blocks of discrete cosine transform coefficients;

an entropy coder connected to said Huffman tables and said quantizer to apply a lossless entropy encoding factor to each block of said plurality of blocks of quantized data to output a plurality of blocks of compressed entropy coded data in a digital file with the lossy quantization factor and the lossless entropy encoding factor applied to each block of said plurality of blocks of compressed entropy coded data.

17. The image compression system as claimed in claim 16 wherein:

said variable quantization subsystem computes the activity metric according to the equation:

$$M_i = \frac{1}{64}\left[\log_2|Y_i[0,0] - Y_{i-1}[0,0]| + \sum_{j,k} \log_2|Y_i[j,k]|\right]$$

where: $Y_i[j,k]$ denote the elements of the i-th block output by the discrete cosine transformer;

$Y_i[0,0]$ denotes the transformed DC component of the i-th block; and the $\log_2$ arguments are greater than zero.

18. The image compression system as claimed in claim 16 wherein:

said variable quantization means includes scaling means for scaling said activity metric for each block of said plurality of blocks of discrete cosine transform coefficients to provide a lower lossy quantization factor for higher activity metrics proportionally than a higher lossy quantization factor for lower activity metrics whereby the text is compressed at a higher quality while the pictures are compressed at a lower quality according to the equations:

$$qscale_i = \begin{cases} a \times M_i + b & \text{if } 2 > a \times M_i + b \geq 0.4 \\ 0.4 & \text{if } a \times M_i + b < 0.4 \\ 2 & \text{if } a \times M_i + b > 2 \end{cases}$$

where: a and b are predetermined functions of the activity metric.

19. The image compression system as claimed in claim 16 wherein:

said variable quantization means includes scaling means for scaling said activity metric for each block of said plurality of blocks of discrete cosine transform coefficients in macroblocks of 16 by 16 blocks to provide a lower lossy quantization factor for higher activity metrics proportionally than a higher lossy quantization factor for lower activity metrics whereby the text is compressed at a higher quality while the pictures are compressed at a lower quality according to the equations:

$$qscale_i = \begin{cases} a \times M_i + b & \text{if } 2 > a \times M_i + b \geq 0.4 \\ 0.4 & \text{if } a \times M_i + b < 0.4 \\ 2 & \text{if } a \times M_i + b > 2 \end{cases}$$

where: a and b are predetermined functions of the activity metric.

20. The image compression system as claimed in claim 16 wherein said blocks of digital pixel data are 8 by 8 pixels.

* * * * *